April 30, 1929.  S. F. ALLEN  1,710,854
CATTLE GUARD
Filed April 14, 1927  2 Sheets-Sheet 1

Spencer F. Allen, INVENTOR.

April 30, 1929.　　　S. F. ALLEN　　　1,710,854
CATTLE GUARD
Filed April 14, 1927　　　2 Sheets-Sheet 2
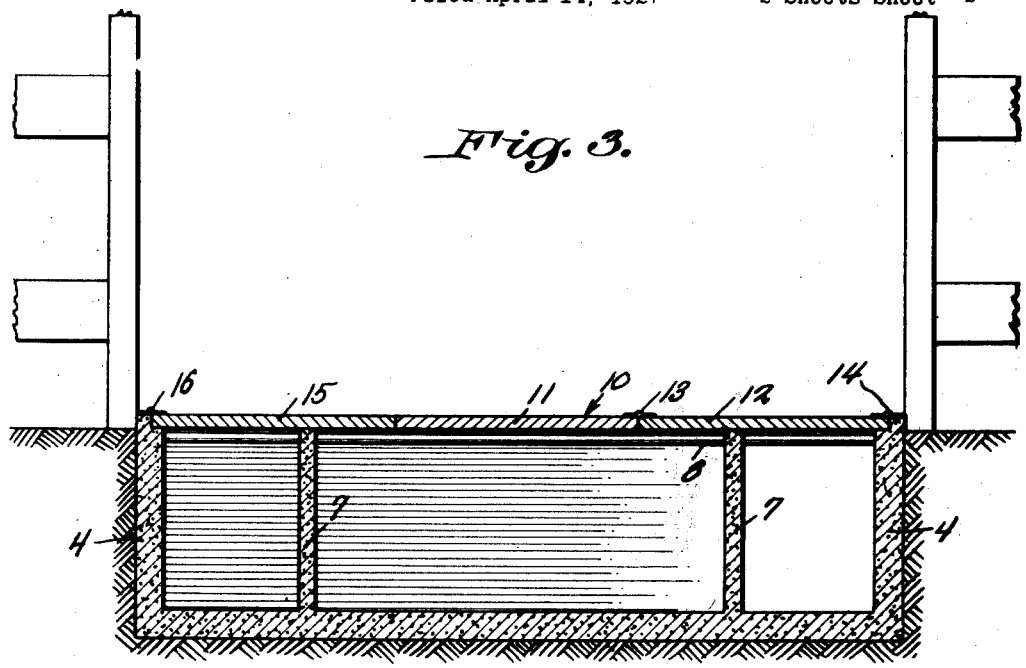
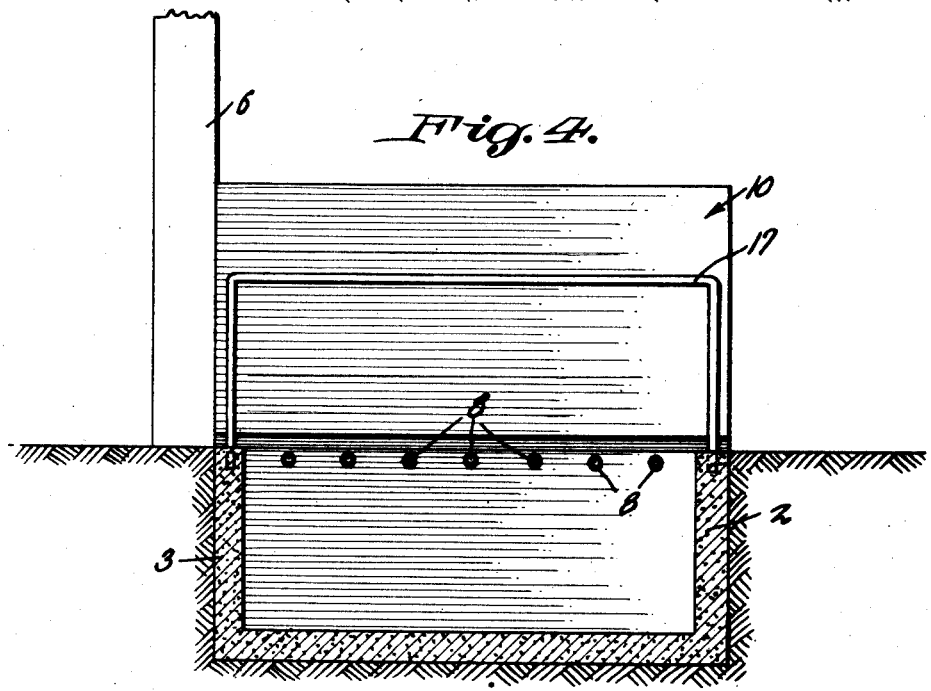
Spencer F. Allen, INVENTOR.

Patented Apr. 30, 1929.

1,710,854

UNITED STATES PATENT OFFICE.

SPENCER F. ALLEN, OF MALAD, IDAHO.

CATTLE GUARD.

Application filed April 14, 1927. Serial No. 183,781.

This invention relates to guard devices for preventing cattle from crossing or walking on railway tracks where the same pass close to a pasture.

The primary object of the present invention is to provide means whereby cattle will be prevented from passing through a gate opening of a fence line thereby permitting a roadway to remain open at all times without the danger of live stock passing through the gate.

The invention broadly contemplates the provision of a cement pit of substantial length and of the same width as the gate-way in association with which the device is to be used, the pit lying between the posts of the gate-way. A plurality of iron pipes are set in the walls of the pit to extend transversely of the top of the same and are spaced sufficiently close together to just permit an animal's hoof to pass therebetween. While this structure permits motor vehicles to pass along the road and through the gate, live stock will not walk over these spaced bars and therefore will not attempt to pass through the gate-way.

A further and final object of the invention is to provide a cattle guard of the character above set forth which will be efficient, strong and durable and comparatively inexpensive to set up.

Numerous other objects and advantages of the present invention will become apparent as the description of the same proceeds, and the invention will be best understood from a consideration of the following detailed description taken in connection with the accompanying drawings forming a part of this invention, with the understanding, however, that the invention is not confined to any strict conformity with the showing of the drawings but may be changed or modified so long as such changes or modifications mark no material departure from the salient features of the invention as expressed in the appended claims.

In the drawings:

Figure 3 is a central longitudinal section through the structure, and

Figure 4 is a central transverse section.

Figure 1:
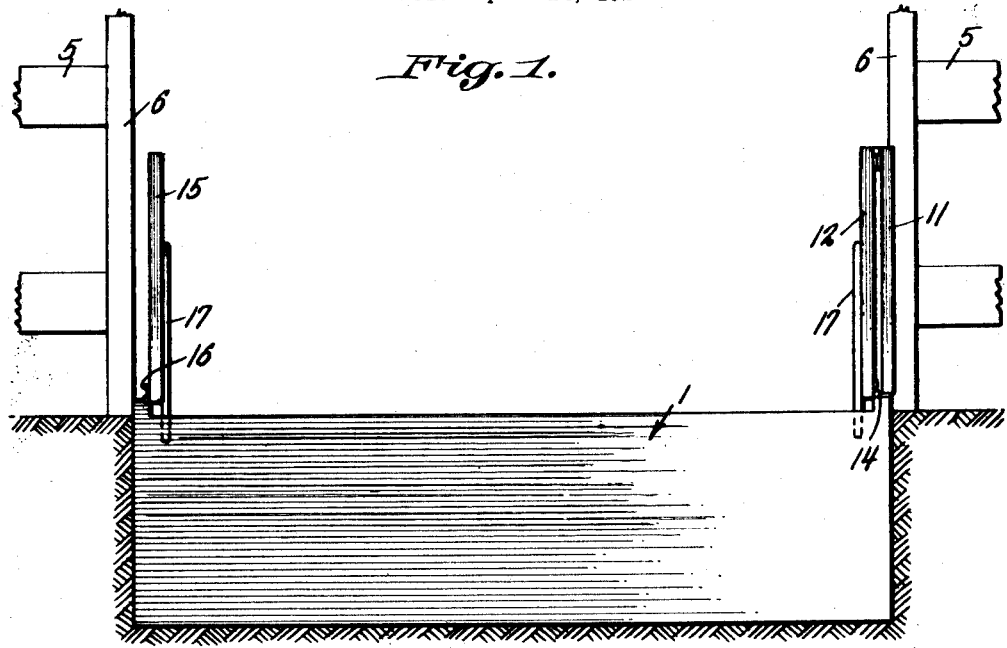
Figure 1 is a front elevational view of the structure embodying this invention.

Referring now to the drawings in detail wherein like numerals of reference indicate corresponding parts throughout the several views, the numeral 1 indicates generally a concrete pit structure having the front and rear walls 2 and 3 and the end walls 4. This structure is arranged in a road-way at a gate-way leading through a fence which might separate a stock pasture from another pasture or from some other property on to which it would be undesirable for cattle to go as for example a railroad right-of-way. The pit is preferably relatively shallow and, although here shown as having a bottom made up of the material from which the walls are formed it is to be understood that the walls only may be formed leaving the bottom of earth.

The fence structure is indicated by the numeral 5 and the gate-way therethrough has at each side the post 6 between which the cattle guard pit 1 is positioned as shown.

Figure 2:
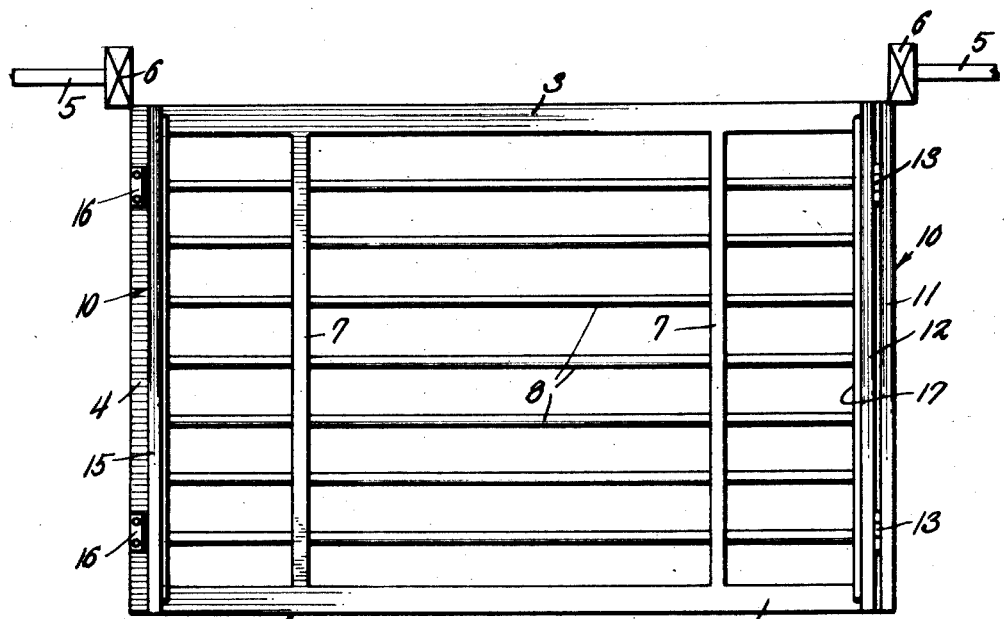
Figure 2 is a top plan view.

The pit 1 is of the same width as the roadway in which it is placed and is made of substantial length, and is provided with a pair, or more, of transversely extending walls 7 as shown in Figures 2 and 3. The transverse walls 7 rest upon the bottom wall of the pit 1 and extend from the front wall 2 to the rear wall 3, the transverse walls functioning to reinforce the pit.

Extending transversely of the pit 1 is a plurality of iron bars or pipes 8, the ends of which are imbedded in the end walls 4. These bars extend through the transverse walls 7 below the upper edges thereof, and are spaced to permit an animal's foot to pass therebetween. The transverse walls 7 assist the end walls 4 to support the bars 8, and these walls are arranged at opposite sides of the transverse center of the pit in planes close to the paths that the wheels of a vehicle would follow in crossing the pit so as to prevent the bars from bending under the weight of the vehicle.

In order to prevent the cattle from stepping across the corner of the pit from a point close to one of the posts 6, and also to permit the passage thereover of an occasional horse drawn vehicle, a trap door structure 10 is provided which comprises a pair of doors 11 and 12 hinged together along their meeting edges as at 13, the door 12 having its opposite edges hingedly secured to the top edge of one end wall 4, as by hinges 14, and a single door 15, having one longitudinal edge hingedly secured as at 16 to the top edge of the other end wall 4 as shown.

As will be readily understood the door 11 is hinged to fold back upon door 12 and the two are then raised to the positions shown in Figure 1 and door 15 is raised to a similar position as shown. The doors are normally maintained in the raised positions shown by the frames 17 which are of U-shaped configuration and arranged in inverted position against the inner faces of the doors with the ends of the legs extended into appropriate apertures formed in the front and rear walls 2 and 3 of the pit, adjacent each end, the frames straddling the pit as shown. Removal of the frames 17 of course permits the doors to be lowered as will be readily understood.

From the foregoing description, it will be seen that vehicles can readily cross the grating of the pit but that animals will be prevented from passing thereover through the catching of their hoofs between the bars 8.

Having thus described my invention, what I claim is:

1. A guard for preventing cattle from passing through a gate-way, comprising a formed pit arranged in the gate-way and having front, rear and end walls, the front and rear walls being provided in their top edges and near the end walls with recesses, bars extending across the pit, frames of inverted U-form extending from the front to the rear wall and having the lower ends of their legs removably positioned in the recesses in said walls, the frames being arranged inwardly of and in substantially parallel relation to the end walls, and doors hinged to the top edges of the end walls and resting against the outer sides of the frames, the doors being adapted to be lowered onto the pit after the removal of the frames.

2. A guard for preventing cattle from passing through a gate-way, comprising a formed pit arranged in the gate-way and having bottom, side, end and transverse walls, the transverse walls resting upon the bottom of the pit and extending from one side wall to the other and functioning to reinforce the pit, and relatively spaced bars supported by and embedded in the end and transverse walls, the transverse walls being arranged at opposite sides of the transverse center of the pit in planes near the paths of the wheels of a vehicle passing over the pit so as to prevent the bars from bending under the weight of the vehicle.

In testimony whereof I affix my signature.

SPENCER F. ALLEN.